United States Patent
Bao et al.

(10) Patent No.: US 10,776,652 B2
(45) Date of Patent: Sep. 15, 2020

(54) SYSTEMS AND METHODS TO IMPROVE VISUAL FEATURE DETECTION USING MOTION-RELATED DATA

(71) Applicant: Baidu USA, LLC, Sunnyvale, CA (US)

(72) Inventors: Yingze Bao, Mountain View, CA (US); Mingyu Chen, Santa Clara, CA (US)

(73) Assignee: Baidu USA LLC, Sunnyvale, CA (US)

( * ) Notice: Subject to any disclaimer, the term of this patent is extended or adjusted under 35 U.S.C. 154(b) by 181 days.

(21) Appl. No.: 16/102,642

(22) Filed: Aug. 13, 2018

(65) Prior Publication Data

US 2019/0095745 A1 Mar. 28, 2019

Related U.S. Application Data

(60) Provisional application No. 62/564,864, filed on Sep. 28, 2017.

(51) Int. Cl.
| | |
|---|---|
| *G06K 9/46* | (2006.01) |
| *G05D 1/02* | (2020.01) |
| *G06T 7/73* | (2017.01) |
| *G06T 7/246* | (2017.01) |

(52) U.S. Cl.
CPC ......... *G06K 9/4604* (2013.01); *G05D 1/0246* (2013.01); *G05D 1/0274* (2013.01); *G06K 9/4671* (2013.01); *G06T 7/246* (2017.01); *G06T 7/73* (2017.01); *G06T 2207/30244* (2013.01)

(58) Field of Classification Search
CPC ...... G06K 9/4604; G06K 9/4671; G06T 7/73; G06T 7/246; G06T 2207/30244; G05D 1/0246; G05D 1/0274

USPC ................................. 382/103, 107, 199, 291
See application file for complete search history.

(56) References Cited

U.S. PATENT DOCUMENTS

| | | | |
|---|---|---|---|
| 9,435,911 B2* | 9/2016 | Yu ........................... | B25J 9/1697 |
| 2009/0154791 A1* | 6/2009 | Yoon .................. | G06K 9/00664 |
| | | | 382/153 |
| 2015/0092048 A1* | 4/2015 | Brunner .................. | H04W 4/33 |
| | | | 348/135 |

OTHER PUBLICATIONS

Yousif, et al. (An Overview to Visual Odometry and Visual SLAM: Applications to Mobile Robotics), Intell Ind Sys, pp. 289-311, (Year: 2015).*

Riisgaard & Blas,"SLAM for Dummies,"A Tutorial Approach to Simultaneous Localization and Mapping, vol. 22, pp. 1-127, 2005. (127pgs).

(Continued)

*Primary Examiner* — Daniel G Mariam
(74) *Attorney, Agent, or Firm* — North Weber & Baugh LLP

(57) ABSTRACT

Described herein are systems and methods that use motion-related data combined with image data to improve the speed and the accuracy of detecting visual features by predict the locations of features using the motion-related data. In embodiments, given a set of features in a previous image frame and given a next image frame, localization of the same set of features in the next image frame is attempted. In embodiments, motion-related data is used to compute the relative pose transformation between the two image frames, and the image location of the features may then be transformed to obtain their location prediction in the next frame. Such a process greatly reduces the search space of the features in the next image frame, and thereby accelerates and improves feature detection.

20 Claims, 8 Drawing Sheets

(56) References Cited

OTHER PUBLICATIONS

B.Hiebert-Treuer,"An Introduction to Robot SLAM (Simultaneous Localization And Mapping)," 2007. Retrieved from Internet <URL: https://ceit.aut.ac.ir/~shiry/lecture/robotics/Robot%20Navigation/Introduction%20to%20SLAM.pdf>. (75pgs.).

Durrant-Whyte et al.,"Simultaneous Localization and Mapping: Part I," IEEE Robotics & Automation Magazine, 2006. (10pgs).

Introduction to Mobile Robotics, SLAM:Simultaneous Localization and Mapping, [online], [Retrieved Sep. 5, 2019]. Retrieved from Internet <URL: http://ais.informatik.uni-freiburg.de/teaching/ss09/robotics/slides/j_slam.pdf> (49 pgs).

* cited by examiner

100

SYSTEMS AND METHODS TO IMPROVE VISUAL FEATURE DETECTION USING MOTION-RELATED DATA

CROSS-REFERENCE TO RELATED APPLICATION

This application claims the priority benefit under 35 USC § 119(e) to U.S. Provisional Patent Application No. 62/564,864, filed on 28 Sep. 2017, entitled "SYSTEMS AND METHODS TO IMPROVE VISUAL FEATURE DETECTION USING MOTION-RELATED DATA," and listing Yingze Bao and Mingyu Chen as inventors. The aforementioned patent document is incorporated by reference herein in its entirety.

BACKGROUND

A. Technical Field

The present disclosure relates generally to systems and methods for improving image processing that can be very useful for robotics or autonomous devices, aiding in localization and mapping of such devices.

B. Background

The rise of robotic system and autonomous system has resulted in a need for such system to be able to find their locations in the real world. This problem is quite complex when the system does not know its location, does not have a mapping of the area in which it is operating, or both. To address this problem, sets of processes, referred to as simultaneous localization and mapping (SLAM), have been developed. SLAM endeavors to have a mobile system, placed at an unknown location in an unknown environment, incrementally build a map of its environment while simultaneously determining its location within this map.

One aspect that is very important to the mapping and locating functions of such system is detecting features in images captured by the system. For example, visual image features are used in visual SLAM to relate consecutive image frames. Given a set of features in a previous frame, a good visual feature detection method attempts to identify the same visual features in the next frame. Due to its nature, visual feature detection must be done with images. In order to accelerate this process, previous attempts mainly focused on image-based improvements. For example, they might focus on optical flow or enhanced feature detection such as, Scale-Invariant Feature Transform (SIFT), Speeded Up Robust Features (SURF), Features from Accelerated Segment Test (FAST), or Difference of Gaussians (DoG). However, while these methods help identify feature points, there are still issues of speed, efficiency, and accuracy.

Accordingly, what is needed are systems and methods that help improve image feature tracking.

BRIEF DESCRIPTION OF THE DRAWINGS

References will be made to embodiments of the inventions, examples of which may be illustrated in the accompanying figures. These figures are intended to be illustrative, not limiting. Although the inventions are generally described in the context of these embodiments, it should be understood that it is not intended to limit the scope of the inventions to these particular embodiments. Items in the figures are not to scale.

DETAILED DESCRIPTION OF EMBODIMENTS

Figure 1:
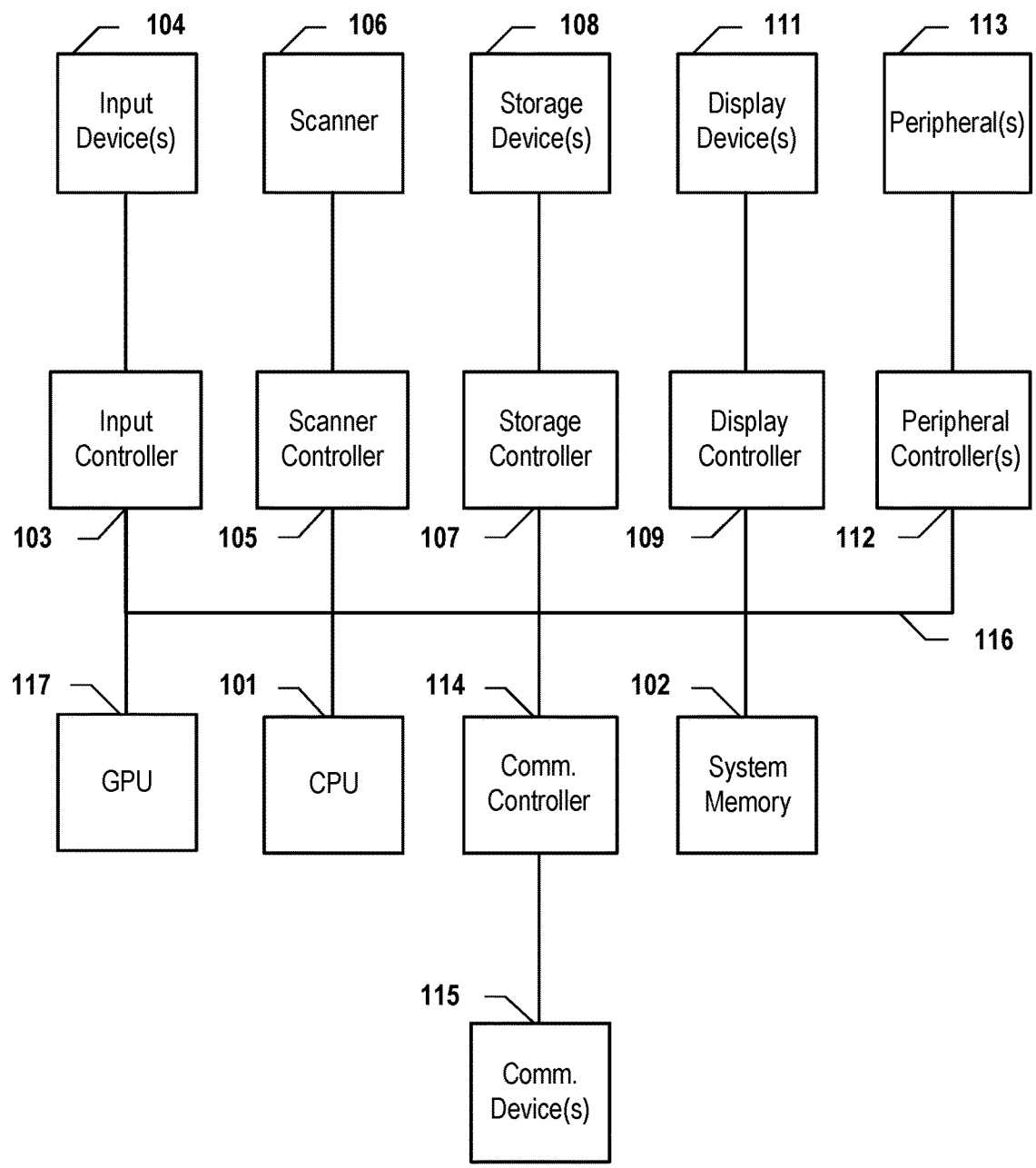
FIG. 1 depicts a simplified block diagram of a computing device/information handling system, in accordance with embodiments of the present document.

In the following description, for purposes of explanation, specific details are set forth in order to provide an understanding of the inventions. It will be apparent, however, to one skilled in the art that the inventions can be practiced without these details. Furthermore, one skilled in the art will recognize that embodiments of the present inventions, described below, may be implemented in a variety of ways, such as a process, an apparatus, a system, a device, or a method on a tangible computer-readable medium.

Components, or modules, shown in diagrams are illustrative of exemplary embodiments of the inventions and are meant to avoid obscuring the inventions. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. System Embodiments

In embodiments, aspects of the present patent document may utilize, may include, or may be implemented on one or more information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be or may include a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

FIG. 1 depicts a simplified block diagram of a computing device/information handling system (or computing system) according to embodiments of the present disclosure. It will be understood that the functionalities shown for system 100 may operate to support various embodiments of a computing system—although it shall be understood that an information handling system may be differently configured and include different components, including fewer or more components depicted in FIG. 1.

As illustrated in FIG. 1, system 100 includes one or more central processing units (CPU) 101 that provides computing resources and controls the computer. CPU 101 may be implemented with a microprocessor or the like, and may also include one or more graphics processing units (GPU) 117 and/or a floating-point coprocessor for mathematical computations. System 100 may also include a system memory 102, which may be in the form of random-access memory (RAM), read-only memory (ROM), or both.

A number of controllers and peripheral devices may also be provided, as shown in FIG. 1. An input controller 103 represents an interface to various input device(s) 104, such as a keyboard, mouse, or stylus. There may also be a scanner controller 105, which communicates with a scanner 106. System 100 may also include a storage controller 107 for interfacing with one or more storage devices 108 each of which includes a storage medium such as magnetic tape or disk, or an optical medium that might be used to record programs of instructions for operating systems, utilities, and applications, which may include embodiments of programs that implement various aspects of the present inventions. Storage device(s) 108 may also be used to store processed data or data to be processed in accordance with the inventions. System 100 may also include a display controller 109 for providing an interface to a display device 111, which may be a cathode ray tube (CRT), a thin film transistor (TFT) display, or other type of display. The computing system 100 may also include one or more peripheral controllers or interfaces 112 for one or more peripherals 113. The peripherals may include one or more printers, mobility system (which may include one or more motors, servo units, etc.), inertial measurement units, vision systems (which may include one or more cameras), sensors, etc. A communications controller 114 may interface with one or more communication devices 115, which enables system 100 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 116, which may represent more than one physical bus. However, various system components may or may not be in physical proximity to one another. For example, input data and/or output data may be remotely transmitted from one physical location to another. In addition, programs that implement various aspects presented herein may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present inventions may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present inventions may further relate to computer products with a non-transitory, tangible computer-readable medium that have computer code thereon for performing various computer-implemented operations. The media and computer code may be those specially designed and constructed for the purposes of the present inventions, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present inventions may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present inventions. One skilled in the art will also recognize that a number of the elements described above may be physically and/or functionally separated into sub-modules or combined together.

1. General Overview

Depicted herein are systems and methods that use motion-related data, such as Inertial Measurement Unit (IMU) data, combined with images to improve the speed and the accuracy of detecting visual features by predict the locations of features using the motion-related data. Such embodiments perform better than pure image-based approaches. In embodiments, given a set of features in a previous image frame and given a next image frame, a goal is to localize the same set of features (or as many as possible) in the next image frame. In embodiments, motion-related data, such as gyroscope(s) data and/or accelerometer(s) data, is used to compute the relative pose transformation between the two image frames. In embodiments, the image location of the features may then be transformed to obtain their location prediction in the next frame. Such a process greatly reduces the search space of the features in the next image frame, and thereby accelerates feature detection, as well as prevent potential false matches. In embodiments, a location refinement may be performed to obtain a feature detection at a sub-pixel level of accuracy. In embodiments, the improved visual feature detection may be used as part of a simultaneous localization and mapping (SLAM) process to help a robotic or autonomous system orient and navigator faster and more accurately.

Figure 2:
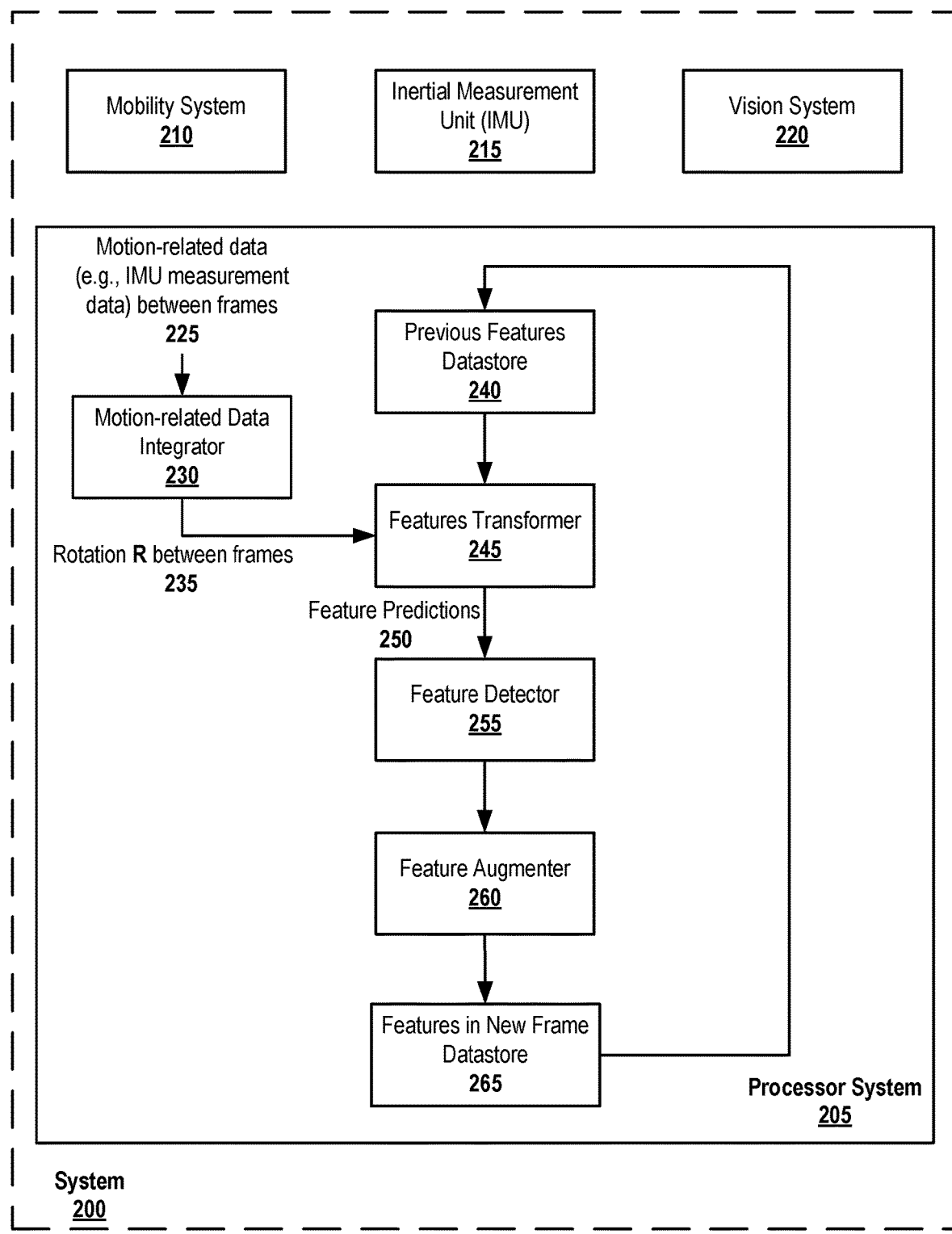
FIG. 2 includes a depiction of an image processor system, which may be part of or work a robotic or autonomous system, according to embodiments of the present document.

FIG. 2 includes a depiction of a processor system, according to embodiments of the present document. As shown in FIG. 2, the processor system 205 may be part of a larger system 200, such as a robotics system, autonomous vehicle, or other similar system. In embodiments, the system may comprise one or more computing systems, or portions thereof, as described with respect to FIG. 1, above. As depicted in FIG. 2, the system 200 may also include a mobility system 210, an inertial measurement unit (IMU) or other motion-related data measurement unit 215, and a vision system (220). It should be noted that system 200 may include additional components, which are not depicted here to avoid obscuring aspects of the present inventions.

In embodiments, the mobility system 210 may include one or more motors, servo units, and/or other systems that facilitate motion of the system 200. In embodiment, the mobility system may include or may be communicatively coupled to a processor systems controls motion of the system via the mobility system 210. Such systems are well known to those of ordinary skill in the art, and any of a variety of such systems may be used. It should be noted that, in embodiments, the system 200 may not include a mobility system. For example, the system may be incorporated into a mobile device, such as tablet computer, smartphone, or laptop, that does not have a mobility system but rather relies upon the user or some other conveyance mechanism or force.

In embodiments, the inertial measurement unit (IMU) 215 may include one or more gyroscopes, accelerometers, or other motion-detecting or motion-related measuring devices that collect data regarding the orientation, speed, velocity, and/or acceleration of the system 200. Such systems are well known to those of ordinary skill in the art, and any of a variety of such systems may be used. It shall be noted that motion-related measurement data may be collected in or along several axes. As is well known to those of ordinary skill in the art, measurement data related to motion of the system may be beneficially used to help determine the position and/or orientation of the system 200.

In embodiments, the vision system 220 may include one or more cameras, which may take video images, still images, or both. Images may be captured from different angles and may be captured simultaneously, sequential, or both. It shall be understood that the terms "image" or "images" as used herein shall mean still images, video images, or both. Such systems are well known to those of ordinary skill in the art, and any of a variety of such systems may be used. As is also well known to those of ordinary skill in the art, images may be beneficially used to help determine the position and/or orientation of the system 200.

As illustrated in FIG. 2, the processor system 205 comprises: a motion-related data integrator 230, a feature transformer 245, a feature detector 255, and a feature augmenter 260. In embodiments, the processor system 205 or the system 200 may comprise a SLAM engine (not shown) or a SLAM processor, which are described in co-pending and commonly assigned U.S. Patent Application No. 62/564,831, filed on Sep. 28, 2017, entitled "SYSTEMS AND METHODS TO ACCOMMODATE STATE TRANSITIONS IN MAPPING," and listing as inventors Yingze Bao and Mingyu Chen, which patent document is incorporated by reference herein in its entirety. While FIG. 2 provides a general overview of components of the processor system 205, the functionality of the components, as well as their overall interactions, are described in more detail below with respect to FIGS. 3-8.

2. Motion-Related Data Integrator Embodiments

Figure 3:
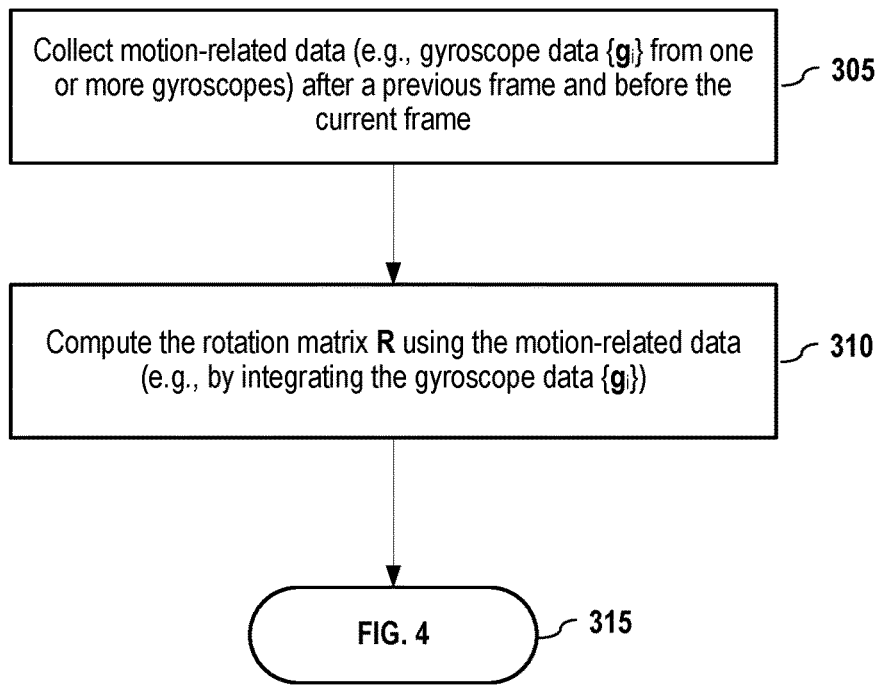
FIG. 3 depicts a method which may be performed, at least in part, by a motion-related data integrator, according to embodiments of the present document.

FIG. 3 depicts a method which may be performed, at least in part, by a motion-related data integrator 230, according to embodiments of the present document. In embodiments, the depicted methodology commences by obtaining or collecting (305) motion-related data at the capture of or near (just before or just after) the capture of a previous image frame and at or near (just before or just after) the capture of the next image frame, which may be referred to herein as the "current" or "new" image frame. In embodiments, as shown in FIG. 2, the motion-related data integrator 230 may receive this information from the IMU 215 (e.g., gyroscope and/or accelerometer data). This information may be continually received by the motion-related data integrator or may be received at various time intervals, as a result of a request, as a result of a trigger event, as a result of a push operation, or any combination thereof. It should be noted that the motion-related data from the IMU 215 may be supplied to the processor system 205, directly to the motion-related data integrator 230, or to both.

In embodiments, the motion-related data comprises gyroscope data collected from a set of one or more gyroscopes, in which one data sample $\{g_i\}$ represents a vector of three values, $[g_x, g_y, g_z]_i$ (e.g., angular velocity along x and y and z directions).

In embodiments, the motion-related data integrator 230 uses the collected motion-related data to compute (310) a rotation matrix R, which represents the motion that occurred during that time period. The rotation matrix may be computed by integrating the gyroscope data $\{g_i\}$. For example, in embodiments, a Runge-Kutta method, such as RK4 integration, is used to estimate the rotation matrix—although other methods may also be employed.

It should be noted that the overall methodology may proceed to engage the feature transformer 245. An example method embodiment that may be employed by the feature transformer 245 is depicted in FIG. 4.

3. Feature Transformer Embodiments

Figure 4:
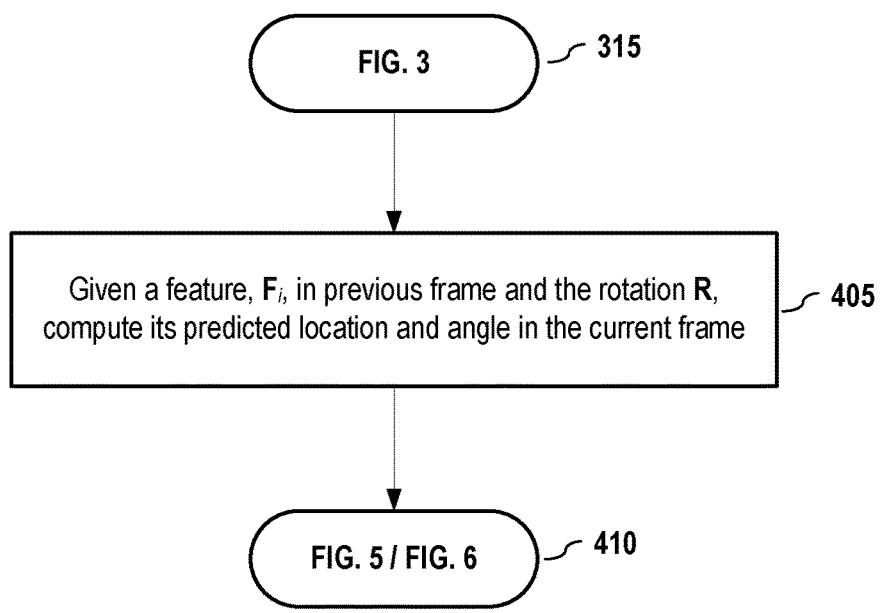
FIG. 4 depicts a method which may be performed, at least in part, by a feature transformer, according to embodiments of the present document.

FIG. 4 depicts a method which may be performed, at least in part, by a feature transformer 245, according to embodiments of the present document. In embodiments, the feature transformer 245 receives a set of features 240 from the previous image frame. In embodiments, the set of features may be obtained from a memory/datastore 240 or may be supplied by a feature detector 255 after having extracted them from the previous image frame. In embodiments in which the previous image frame was a current image in a prior iteration of a method embodiment discussed herein, the set of features may alternatively be obtained from the feature augmenter 260, a new features memory/datastore 265, and/or the previous features memory 240 (after being updated, see e.g., Step 810 of FIG. 8).

In embodiments, a feature may be denoted as $F_i=[x, y, a, d]_i$, where x, y represent the location of the feature in the image, a is the angle of the feature (or a=0 for a feature that does not require an angle to extract descriptors), and d is the descriptor vector or, alternatively, a local image patch for descriptor-less features.

In embodiments, the feature transformer 245 also receives the rotation matrix R 235, which was computed by the integrator 230. In embodiments, for each feature, $F_i$, from the set of features of the previous image frame, the feature transformer uses the rotation matrix R to try to predict (405) that feature's location and angle in the current image frame. For example, in embodiments, the predicted location, $[x_{new}, y_{new}]$, in the current image frame of a feature having a location [x, y] in the previous image frame may be determined as follows:

$$[x_{new}, y_{new}, 1]^T = KRK^{-1}[x, y, 1]^T,$$

where K represents the intrinsic camera parameters, and R is the rotation matrix from the integrator 230.

In embodiments, the angle, $a_{new}$, of the prediction may be computed numerically as the following—assume $\Delta$ is a very small value (e.g., 0.01 pixels), the "tip" is computed as:

$$[x_{tip}, y_{tip}, 1]^T = KRK^{-1}[x+\Delta \cos a, y+\Delta \sin a, 1]^T; \text{ and}$$

$$a_{new} = (\cos^{-1}(x_{tip}-x_{new})/\Delta + \sin^{-1}(y_{tip}-y_{new})/\Delta)/2.$$

In embodiments, the descriptor, d, for the feature is kept the same. Thus, the feature prediction is obtained as:

$$F_i^{new} = [x_{new}, y_{new}, a_{new}, d]_i$$

Figure 5:
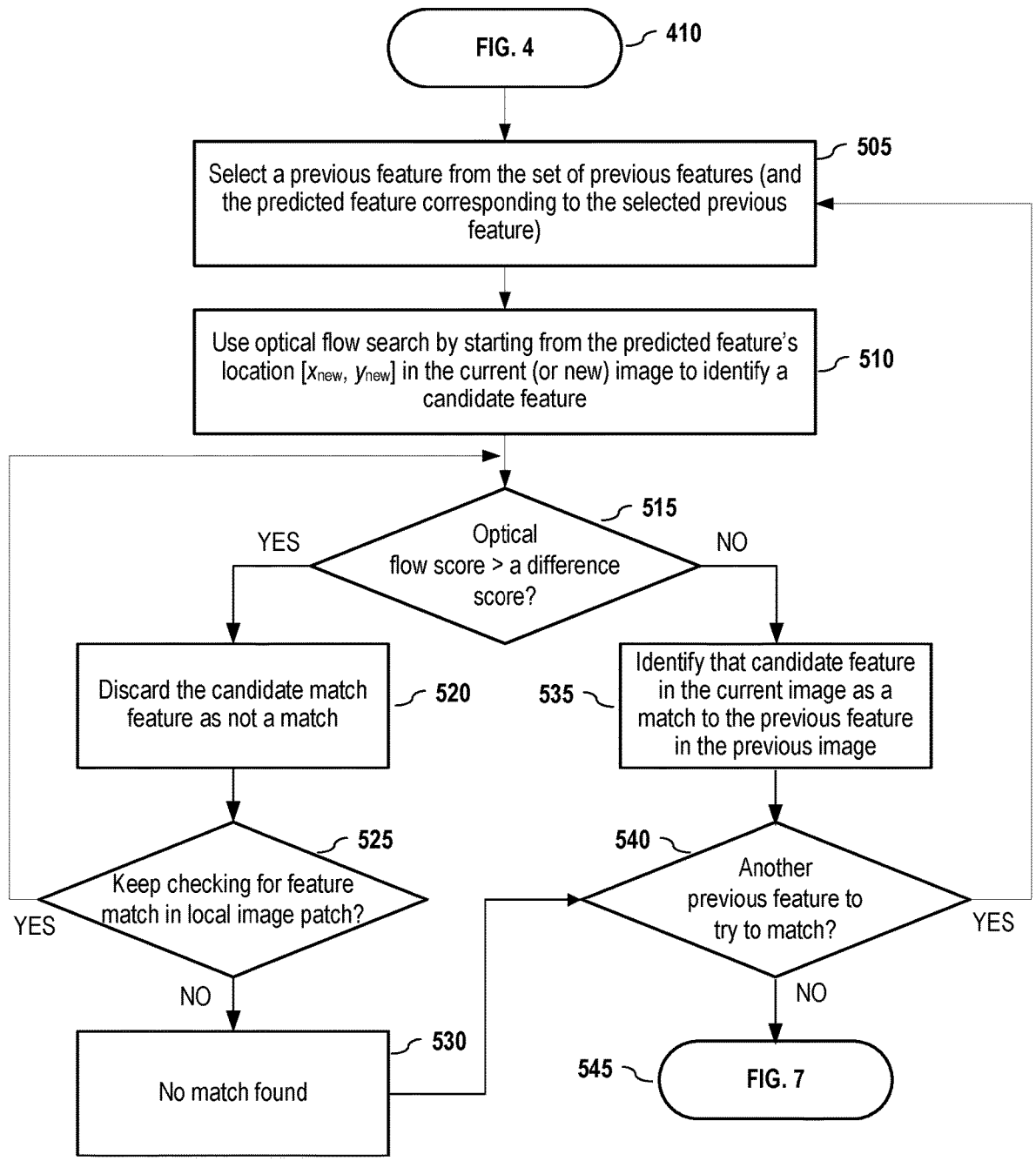
FIG. 5 depicts a method which may be performed, at least in part, by a feature detector, according to embodiments of the present document.
Figure 6:
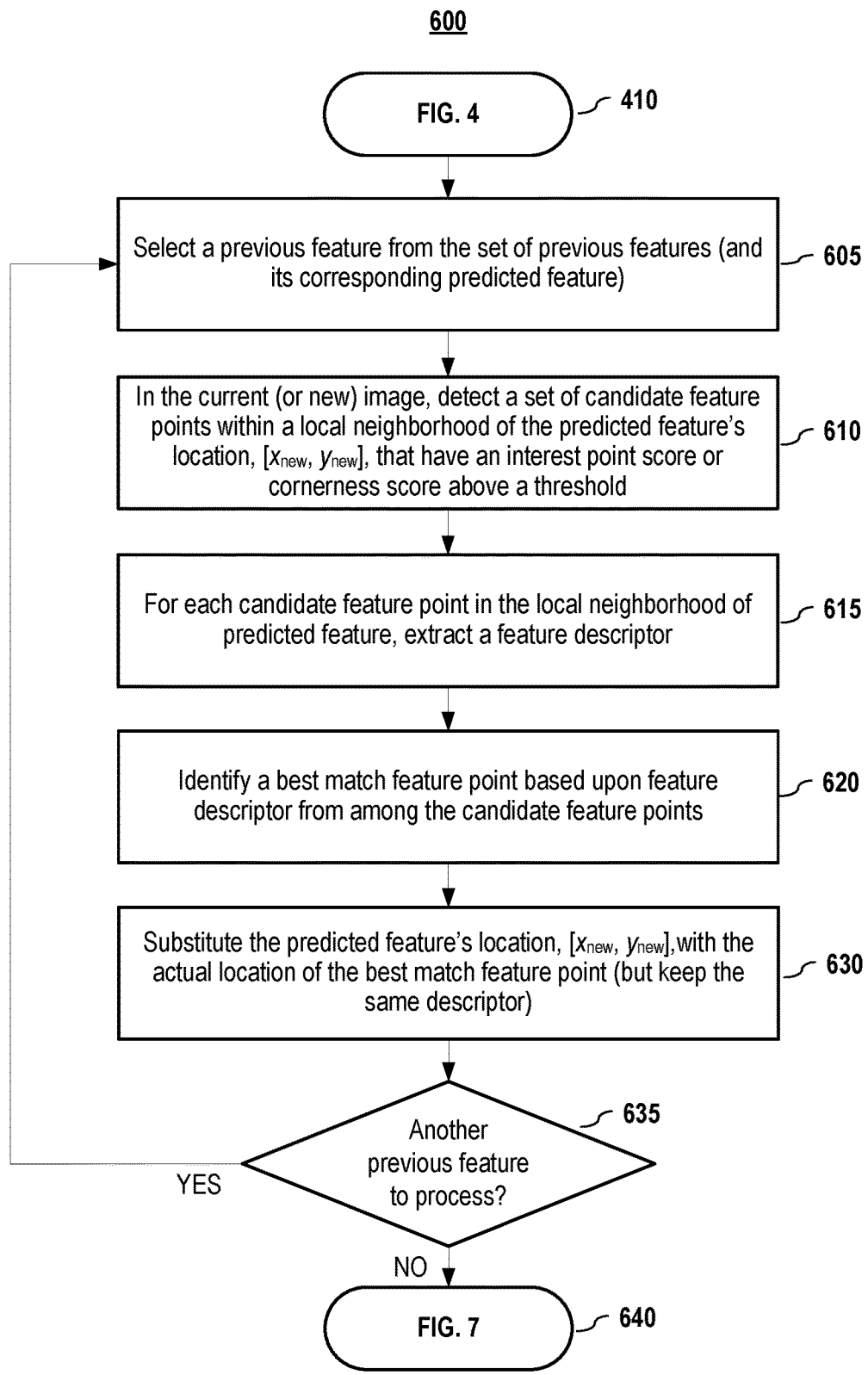
FIG. 6 depicts another method which may be performed, at least in part, by a feature detector, according to embodiments of the current disclosure.

Having obtained predicted features for each feature in the set of features, in embodiments, the feature transformer 245 supplies the predicted features 250 to the feature detector 255, and these predictions may then be used to help locate the features in the current image frame. One skilled in the art shall recognize that various methods may be employed to search for or otherwise detect a feature in an image given its predicted location. FIGS. 5 and 6 provide two example methods that may be performed by the feature detector 255.

4. Feature Detector Embodiments

As noted, the feature detector may employ one or more feature detection methods to identify features in the current image that correspond to features in the previous image. In embodiments, image data from the vision system 220 may be supplied directly to the feature detector 255 or may be supplied via one or more other system components, including via the processor system 205, or a combination thereof.

a) Embodiments where the Feature Descriptor is a Local Image Patch

In embodiments, the method employed by the feature detector 255 may depend upon the type of feature descriptor. FIG. 5 depicts a method which may be performed, at least in part, by a feature detector, according to embodiments of the present document, when the feature descriptor, d, is a local image patch.

As shown in the embodiment depicted in FIG. 5, the process commences by selecting (505) a previous feature from the set of previous features and its corresponding predicted feature location. In embodiments, optical flow search is performed (510) by starting from the predicted feature's location, $[x_{new}, y_{new}]$, in the current image frame to identify a candidate feature that may be a match to the selected previous feature.

If the optical flow score for the candidate feature in the current image frame is (515) higher than a difference score (e.g., average pixel value difference is higher than 20), the candidate feature is discarded (520) as not being a match for the selected previous feature. In embodiments, the feature detector 255 may continue (525) to keep checking for a feature match in the local image patch (or may expand the search beyond the local image patch); otherwise, the feature detector 255 may deem (530) that there is no match found in the current image.

In embodiments, the process may return to step 505 if there is (540) another feature from the set of previous features that has yet to be tried to match to a feature in the current image.

Figure 7:
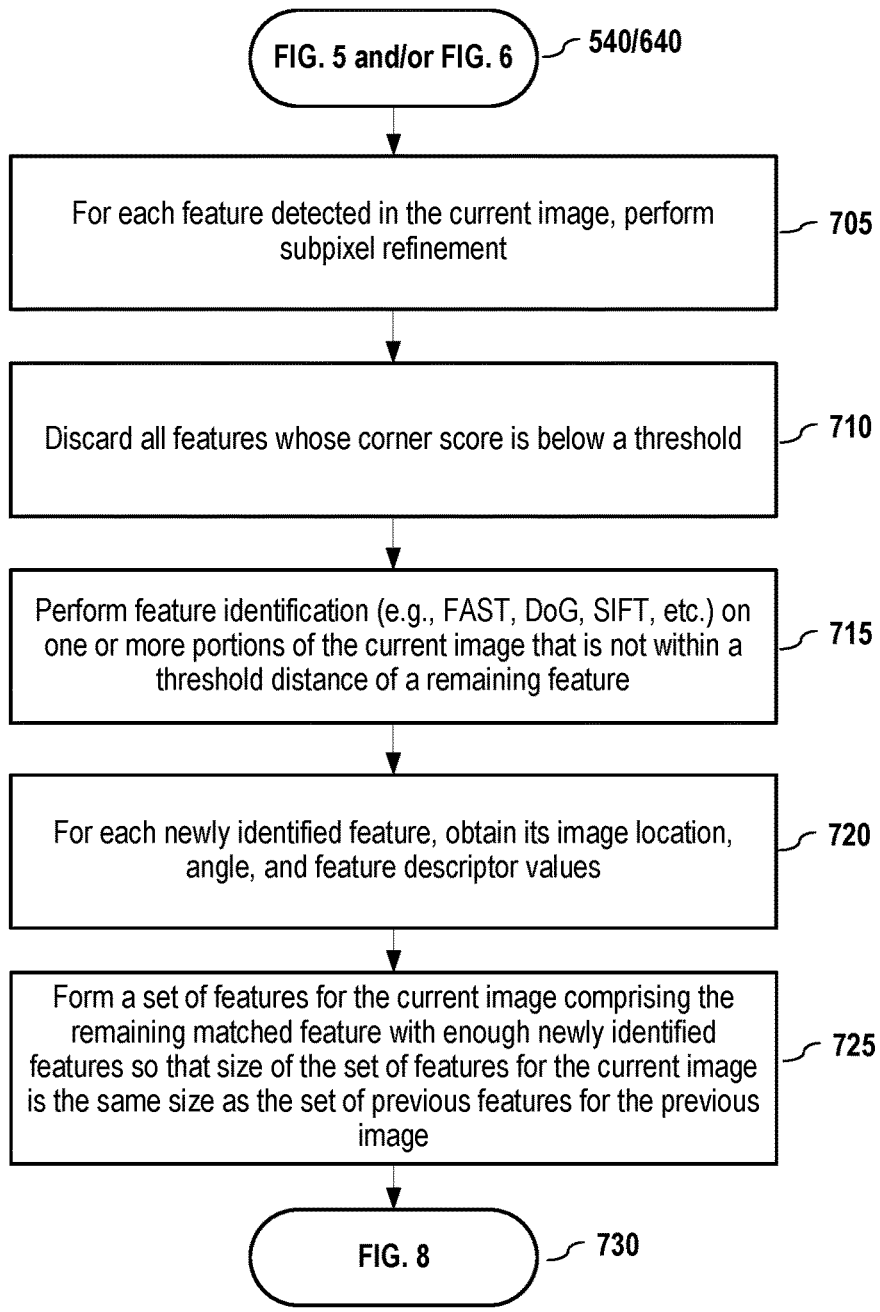
FIG. 7 depicts a method which may be performed, at least in part, by a feature augmenter, according to embodiments of the present disclosure.

If there are no other previous features to be processed, in embodiments, the overall methodology may proceed to engage the feature augmenter 260. An example method embodiment that may be employed by the feature augmenter 260 is depicted in FIG. 7.

If the optical flow score for the candidate feature in the current image is (515) not below a match threshold value, that candidate feature may be identified (535) as being a match for the selected previous feature.

As noted above, in embodiments, the process may return to step 505 if there is (540) another feature from the set of previous features that has yet to be tried to match to a feature in the current image. If there are no other previous features to be processed, in embodiments, the overall methodology may proceed to engage the feature augmenter 260. An example method embodiment that may be employed by the feature augmenter 260 is depicted in FIG. 7.

It should be noted that while the method shown in FIG. 5 depicts the feature detection process as being done sequentially by previous feature, one skill in the art shall recognize that it may be done in a batch or concurrently.

b) Embodiments where the Feature Descriptor is a Descriptor Value or Values

FIG. 6 depicts a method which may be performed, at least in part, by a feature detector, according to embodiments of the present document, when the feature descriptor, d, is a descriptor value or values. One skilled in the art shall recognize that a number of different methodologies may be employed to extract image feature descriptors. Examples include, but are not limited to, Oriented FAST and Rotated BRIEF (ORB), Speeded-Up Robust Features (SURF), Scale Invariant Feature Transform (SIFT), Principal Component Analysis SIFT (PCA-SIFT), Difference of Gaussians (DoG), and Features from Accelerated Segment Test (FAST).

As shown in the embodiment depicted in FIG. 6, the process may commence by selecting (605) a previous feature from the set of previous features and its corresponding predicted feature location. In the current image, a set of candidate feature points within a local neighborhood (e.g., a radius of 30 pixels) of the predicted feature's location, $[x_{new}, y_{new}]$, that have an interest point score or cornerness score (e.g., FAST, DoG, etc.) above a threshold (e.g., 20 for FAST) may be selected (610) for further examination. Cornerness represents a likelihood that a pixel and its surrounding pixels resemble a corner in the image.

In embodiments, a set of feature descriptors, $d_{i_j}$, may be extracted for each candidate feature in the local neighborhood of the predicted feature's location, $[x_{new}, y_{new}]$, where j represents the jth candidate feature in the current image corresponding to the ith previous feature from the set of previous features. While there are a number of different types of feature descriptors that may be extracted by the feature detector 255, in embodiments, the feature descriptor should be of the same type as the previous feature to allow for direct comparison between the previous feature descriptor $d_i$ and each of its corresponding candidate feature descriptors, $d_{i_j}$. In embodiments, from among the candidate features, a best match feature is identified (620) based upon the comparison of feature descriptors with the previous feature. In embodiments, the predicted feature's location, $[x_{new}, y_{new}]$, is updated (630) with the actual location of the best match feature point. In embodiments, while the location is updated, the descriptor, $d_i$, is kept the same as the previous feature. In embodiments, if there is no best match candidate, this previous feature may be discarded.

In embodiments, the process may return to step 605 if there is (635) another feature from the set of previous features that has yet to be tried to match to a feature in the current image. If there are no other previous features to be processed, in embodiments, the overall methodology may proceed to engage the feature augmenter 260. An example method embodiment that may be employed by the feature augmenter 260 is depicted in FIG. 7.

It should be noted that while the method shown in FIG. 6 depicts the feature detection process as being done sequentially by previous feature, one skill in the art shall recognize that it may be done in a batch or concurrently.

5. Feature Augmenter Embodiments

FIG. 7 depicts a method which may be performed, at least in part, by a feature augmenter, according to embodiments of the present disclosure. In embodiments, subpixel refinement may be performed (705) for the detected features in the current image. An example of subpixel refinement that may be used is discussed by Stefan Leutenegger, Margarita Chli and Roland Siegwart in "BRISK: Binary Robust Invariant Scalable Keypoints," Proceedings of the IEEE International Conference on Computer Vision (ICCV) 2011, which is incorporated by reference herein in its entirety—although other subpixel refinement approaches may be used. In embodiments, based upon the subpixel refinement, each feature whose corner score is below a threshold may be discarded (710).

Since the feature detector 255, the feature augmenter 260, or both may have discarded some features, in embodiments, the remaining features are supplemented so that the total number of overall feature output is equal to the input features from the previous frame. Thus, in embodiments, one or more methods (e.g., FAST, DoG, SIFT, etc.) of feature identification may be performed (715) on one or more portions of the current image. In embodiments, the portion or portions of the image selected for feature identification may be those areas of the image that are not within a threshold distance of one of the remaining features. For example, a mask may be applied to the current image that masks the area(s) where the remaining features are and a region within 40 pixels of the remaining features, and new images are identified from the non-mask image portion(s). For each newly identified feature, its image location, angle, and feature descriptor value (i.e., [x, y, a, d]) are obtained (720). Finally, a set of features for the current image are formed (725) comprising the remaining matched features plus enough newly identified features so that size of the set of features for the current image is the same as the size as of the set of previous features for the previous image.

While not depicted in the figures, it should be noted that, in embodiments, as new image frames and correlations of feature points between images are obtained, the system 200 and/or processor system 205 may use this information to update the location and orientation information of the system 200. It shall be noted that a SLAM engine (not shown) may use this information to perform one or more a simultaneous localization and mapping (SLAM) methods. Examples of SLAM methods include, but are not limited to, Multi-State Constraint Kalman Filter (MSCKF), Open Keyframe-based Visual-Inertial SLAM (OKVIS), Parallel Tracking and Mapping (PTAM), ORB-SLAM, and the like.

Figure 8:
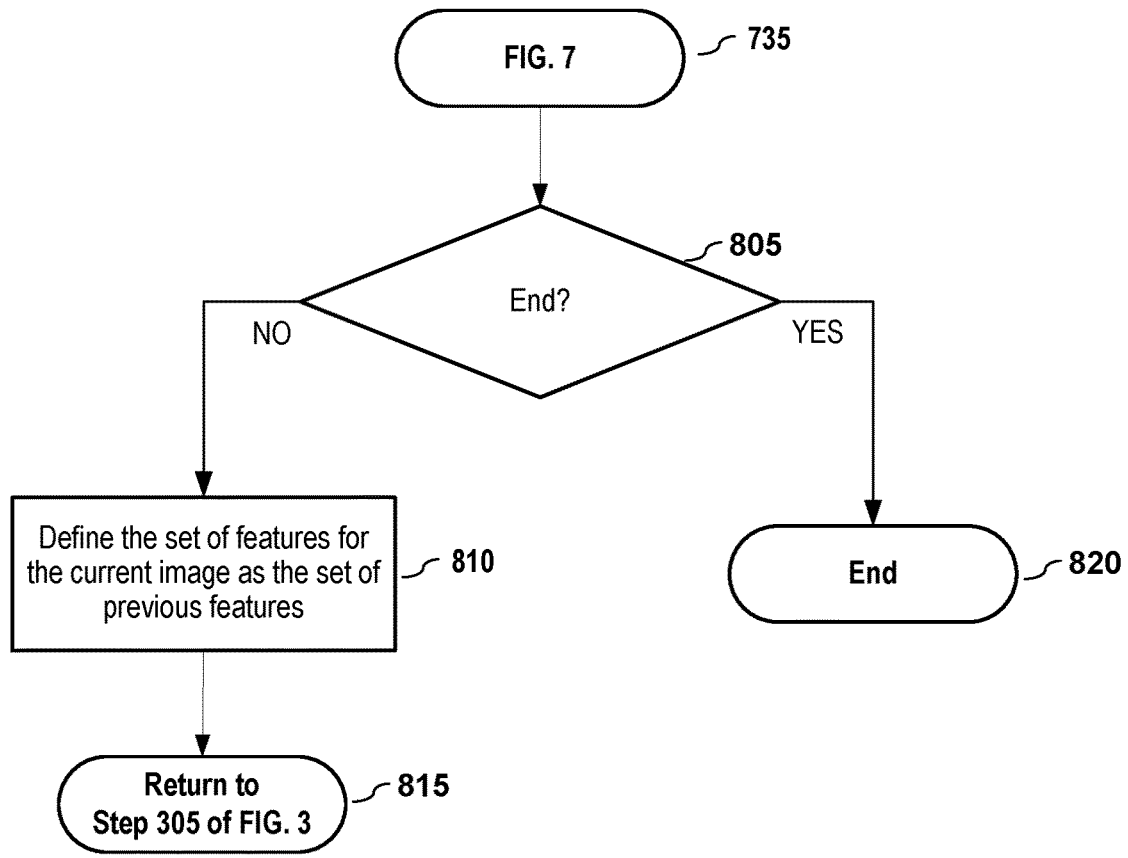
FIG. 8 depicts a method which may be performed, at least in part, by a system processor, which may be or include a simultaneous localization and mapping (SLAM) engine, according to embodiments of the present document.

It should be noted that the overall process may be repeated. FIG. 8 depicts a method which may be performed, at least in part, by the feature augmenter and/or the system processor, according to embodiments of the present document. In embodiments, once the features have been identified in the current image frame, the processor system 205 may determine (805) whether to end the process. If additional processing is wanted, the overall process may be repeated with the set of features from the current image being set (810) as the set of previous features and the current image frame becoming the previous image frame. The process may then return (815) to Step 305 of FIG. 3.

If ending (805) the process is decided, in embodiments, ending the process may comprise using the features correlated between the previous image frame and the current image frame to update mapping data for the system 200, in like manner as discussed in the preceding paragraph and then end; or alternatively, the processor system 205 may simply end (820).

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A non-transitory computer-readable medium or media comprising one or more sequences of instructions which, when executed by one or more processors, causes steps for visual feature detection using motion-related data of a mobile system comprising:
   receiving motion-related data of the mobile system from a time period at or after capture of a previous image frame to before or at the capture of a current frame;
   using at least some of the motion-related data to determine a rotation for motion of the mobile system during at least a portion of the time period;
   for each previous feature from a set of previous features in the previous image frame:
     given a previous feature in the previous image frame from a set of previous features in the previous image frame and the rotation, determining the previous feature's predicted location and angle in the current image frame;
     detecting one or more similar features in the current image frame using at least the previous feature's predicted location;
   performing subpixel refinement for at least some of the detected similar features in the current image; and
   discarding each detected similar feature, following subpixel refinement, whose corner score is below a corner score threshold to obtain a set of remaining features in the current image frame; and
   using at least some of the previous features and at least some of the remaining features to update a location and orientation of the mobile system.

2. The non-transitory computer-readable medium or media of claim 1 wherein the step of using at least some of the previous features and at least some of the remaining features to update a location and orientation of the mobile system comprises:
   performing one or more simultaneous localization and mapping (SLAM) methods using at least some of the previous features and at least some of the remaining features to update a location and orientation of the mobile system.

3. The non-transitory computer-readable medium or media of claim 1 wherein the step of detecting one or more similar features in the current image frame using at least the previous feature's predicted location comprises:
   given a previous feature from the set of previous features and the previous feature's predicted location:
     performing optical flow search by starting from the predicted location in the current image frame to identify a candidate feature that is potentially a match to the previous feature;
     responsive to an optical flow score for the candidate feature in the current image frame being higher than a difference threshold score, discarding the candidate feature as not being a match for the previous feature; and
     responsive to an optical flow score for the candidate feature in the current image frame not being higher than a difference threshold score, classifying the candidate feature as being a match for the previous feature.

4. The non-transitory computer-readable medium or media of claim 3 wherein the step of responsive to an optical flow score for the candidate feature in the current image frame being higher than a difference threshold score further comprises:
   responsive to determining to continue to search for a candidate feature:
     searching in the current image frame within a local image patch of the previous feature's predicted location in the current image frame for a candidate feature;
     responsive to an optical flow score for the candidate feature in the current image frame being higher than a difference threshold score, discarding the candidate feature as not being a match for the previous feature; and
     responsive to an optical flow score for the candidate feature in the current image frame not being higher than a difference threshold score, classifying the candidate feature as being a match for the previous feature; and
   responsive to determining to stop searching for a candidate feature, deeming that there is no match found in the current image for the previous feature.

5. The non-transitory computer-readable medium or media of claim 1 wherein a feature includes a location in an image frame and a descriptor and wherein the step of detecting one or more similar features in the current image frame comprises:
   given a previous feature from the set of previous features and the previous feature's predicted location:
     identifying a set of candidate feature points within a local neighborhood of the predicted feature's location that have an interest point score or cornerness score above a threshold;
     extracting a feature descriptor for each candidate feature from the set of candidate feature points;

selecting a best match feature from the set of candidate feature points based at least upon a comparison of feature descriptors with the previous feature; and updating the predicted feature's location with an actual location of the best match feature.

6. The non-transitory computer-readable medium or media of claim 5 further comprising the step of:

responsive to there being no best match feature, discarding the previous feature.

7. The non-transitory computer-readable medium or media of claim 1 further comprising the step of:

performing one or more feature identification methods on one or more portions of the current image to identify a set of supplemental features.

8. The non-transitory computer-readable medium or media of claim 7 wherein the one or more portions of the current image selected for feature identification are those portions of the current image that are not within a threshold distance of one of the remaining features.

9. The non-transitory computer-readable medium or media of claim 1 further comprising the step of:

supplementing the set of remaining features of the current image frame so that a total number of features from the current image frame is within a numerical range of the set of previous features.

10. A processor-implement method for visual feature detection using motion-related data of a mobile system, the method comprising:

receiving motion-related data of the mobile system from a time period at or after capture of a previous image frame to before or at the capture of a current frame;

using at least some of the motion-related data to determine a rotation for motion of the mobile system during at least a portion of the time period;

for each previous feature from a set of previous features in the previous image frame:

given a previous feature in the previous image frame from a set of previous features in the previous image frame and the rotation, determining the previous feature's predicted location and angle in the current image frame;

detecting one or more similar features in the current image frame using at least the previous feature's predicted location;

performing subpixel refinement for at least some of the detected similar features in the current image; and discarding each detected similar feature, following subpixel refinement, whose corner score is below a corner score threshold to obtain a set of remaining features in the current image frame; and using at least some of the previous features and at least some of the remaining features to update a location and orientation of the mobile system.

11. The processor-implemented method of claim 10 wherein the step of using at least some of the previous features and at least some of the remaining features to update a location and orientation of the mobile system comprises:

performing one or more simultaneous localization and mapping (SLAM) methods using at least some of the previous features and at least some of the remaining features to update a location and orientation of the mobile system.

12. The processor-implemented method of claim 10 wherein the step of detecting one or more similar features in the current image frame using at least the previous feature's predicted location comprises:

given a previous feature from the set of previous features and the previous feature's predicted location:

performing optical flow search by starting from the predicted location in the current image frame to identify a candidate feature that is potentially a match to the previous feature;

responsive to an optical flow score for the candidate feature in the current image frame being higher than a difference threshold score, discarding the candidate feature as not being a match for the previous feature; and responsive to an optical flow score for the candidate feature in the current image frame not being higher than a difference threshold score, classifying the candidate feature as being a match for the previous feature.

13. The processor-implemented method of claim 12 wherein the step of responsive to an optical flow score for the candidate feature in the current image frame being higher than a difference threshold score further comprises:

responsive to determining to continue to search for a candidate feature:

searching in the current image frame within a local image patch of the previous feature's predicted location in the current image frame for a candidate feature;

responsive to an optical flow score for the candidate feature in the current image frame being higher than a difference threshold score, discarding the candidate feature as not being a match for the previous feature; and responsive to an optical flow score for the candidate feature in the current image frame not being higher than a difference threshold score, classifying the candidate feature as being a match for the previous feature; and responsive to determining to stop searching for a candidate feature, deeming that there is no match found in the current image for the previous feature.

14. The processor-implemented method of claim 10 wherein a feature includes a location in an image frame and a descriptor and wherein the step of detecting one or more similar features in the current image frame comprises:

given a previous feature from the set of previous features and the previous feature's predicted location:

identifying a set of candidate feature points within a local neighborhood of the predicted feature's location that have an interest point score or cornerness score above a threshold;

extracting a feature descriptor for each candidate feature from the set of candidate feature points;

selecting a best match feature from the set of candidate feature points based at least upon a comparison of feature descriptors with the previous feature; and updating the predicted feature's location with an actual location of the best match feature.

15. The processor-implemented method of claim 14 further comprising the step of:

responsive to there being no best match feature, discarding the previous feature.

16. A mobile system for visual feature detection using motion-related data of the mobile system comprising:

a vision system for capturing one or more image frames;

one or more sensors for capturing motion-related data;

one or more processors; and a non-transitory computer-readable medium or media comprising one or more sequences of instructions which, when executed by at least one processor of the one or more processors, causes steps to be performed comprising:
receiving motion-related data of the mobile system from a time period at or after capture of a previous image frame to before or at the capture of a current frame;
using at least some of the motion-related data to determine a rotation for motion of the mobile system during at least a portion of the time period;
for each previous feature from a set of previous features in the previous image frame:
given a previous feature in the previous image frame from a set of previous features in the previous image frame and the rotation, determining the previous feature's predicted location and angle in the current image frame;
detecting one or more similar features in the current image frame using at least the previous feature's predicted location;
performing subpixel refinement for at least some of the detected similar features in the current image; and
discarding each detected similar feature, following subpixel refinement, whose corner score is below a corner score threshold to obtain a set of remaining features in the current image frame; and
using at least some of the previous features and at least some of the remaining features to update a location and orientation of the mobile system.

17. The mobile system of claim 16 wherein the step of using at least some of the previous features and at least some of the remaining features to update a location and orientation of the mobile system comprises:
performing one or more simultaneous localization and mapping (SLAM) methods using at least some of the previous features and at least some of the remaining features to update a location and orientation of the mobile system.

18. The mobile system of claim 16 wherein the step of detecting one or more similar features in the current image frame using at least the previous feature's predicted location comprises:
given a previous feature from the set of previous features and the previous feature's predicted location:
performing optical flow search by starting from the predicted location in the current image frame to identify a candidate feature that is potentially a match to the previous feature;
responsive to an optical flow score for the candidate feature in the current image frame being higher than a difference threshold score, discarding the candidate feature as not being a match for the previous feature; and
responsive to an optical flow score for the candidate feature in the current image frame not being higher than a difference threshold score, classifying the candidate feature as being a match for the previous feature.

19. The mobile system of claim 18 wherein the step of responsive to an optical flow score for the candidate feature in the current image frame being higher than a difference threshold score further comprises:
responsive to determining to continue to search for a candidate feature:
searching in the current image frame within a local image patch of the previous feature's predicted location in the current image frame for a candidate feature;
responsive to an optical flow score for the candidate feature in the current image frame being higher than a difference threshold score, discarding the candidate feature as not being a match for the previous feature; and
responsive to an optical flow score for the candidate feature in the current image frame not being higher than a difference threshold score, classifying the candidate feature as being a match for the previous feature; and
responsive to determining to stop searching for a candidate feature, deeming that there is no match found in the current image for the previous feature.

20. The mobile system of claim 16 wherein a feature includes a location in an image frame and a descriptor and wherein the step of detecting one or more similar features in the current image frame comprises:
given a previous feature from the set of previous features and the previous feature's predicted location:
identifying a set of candidate feature points within a local neighborhood of the predicted feature's location that have an interest point score or cornerness score above a threshold;
extracting a feature descriptor for each candidate feature from the set of candidate feature points;
selecting a best match feature from the set of candidate feature points based at least upon a comparison of feature descriptors with the previous feature; and
updating the predicted feature's location with an actual location of the best match feature.

* * * * *